(12) United States Patent
Varcoe

(10) Patent No.: US 7,472,916 B2
(45) Date of Patent: Jan. 6, 2009

(54) LOG HAULER

(76) Inventor: Jason Varcoe, RR#1, Perth (CA) K7H 3C3

( * ) Notice: Subject to any disclaimer, the term of this patent is extended or adjusted under 35 U.S.C. 154(b) by 344 days.

(21) Appl. No.: 11/309,386

(22) Filed: Aug. 3, 2006

(65) Prior Publication Data
US 2008/0011143 A1 Jan. 17, 2008

(30) Foreign Application Priority Data
Jul. 10, 2006 (CA) ................... 2551304

(51) Int. Cl.
*B62M 27/00* (2006.01)
(52) U.S. Cl. ............... 280/19; 280/28.13; 280/79.6; 414/23; 414/460
(58) Field of Classification Search ............ 280/18, 280/19, 24, 28.12, 28.13, 79.6; 414/23, 460
See application file for complete search history.

(56) References Cited

U.S. PATENT DOCUMENTS

| | | | |
|---|---|---|---|
| 367,172 A | 7/1887 | Wisdom | |
| 420,733 A * | 2/1890 | Pangborn et al. | 280/19 |
| 891,385 A * | 6/1908 | Strange | 414/460 |
| 1,556,659 A | 2/1925 | Williamson | |
| 2,050,548 A * | 8/1936 | Uhren et al. | 280/19 |
| 2,430,786 A * | 11/1947 | Schlabach et al. | 414/434 |
| 2,786,691 A * | 3/1957 | Martin | 280/28.13 |
| 3,086,666 A | 4/1963 | Larson | |
| 3,339,656 A * | 9/1967 | Blonsky | 180/119 |
| 3,517,839 A | 6/1970 | Jorgensen | |
| 3,741,526 A | 6/1973 | Kasin et al. | |
| 3,926,410 A * | 12/1975 | McLeod | 254/1 |
| 5,037,118 A * | 8/1991 | Straube | 280/79.6 |
| 5,876,174 A * | 3/1999 | Arsenault | 414/460 |
| 6,276,698 B1 * | 8/2001 | Calandra | 280/19 |
| 6,675,848 B2 | 1/2004 | Chai | |
| 6,932,555 B2 * | 8/2005 | Dale et al. | 414/607 |
| 2004/0071538 A1 * | 4/2004 | Musfeldt | 414/555 |

* cited by examiner

*Primary Examiner*—Christopher P Ellis
*Assistant Examiner*—Jason D. Walters
(74) *Attorney, Agent, or Firm*—McFadden, Fincham

(57) ABSTRACT

A log hauling device is provided which includes a frame member; a connection means at one end of the frame member for connection of the frame member to a tow vehicle; a log carriage slidably mounted on the frame member; and a retaining member for retaining a log in the log carriage. The log carriage is slidably mounted on the frame member for movement from a log loading position adjacent a proximal end of the frame member to an extended position adjacent to a distal end of the frame member.

20 Claims, 6 Drawing Sheets

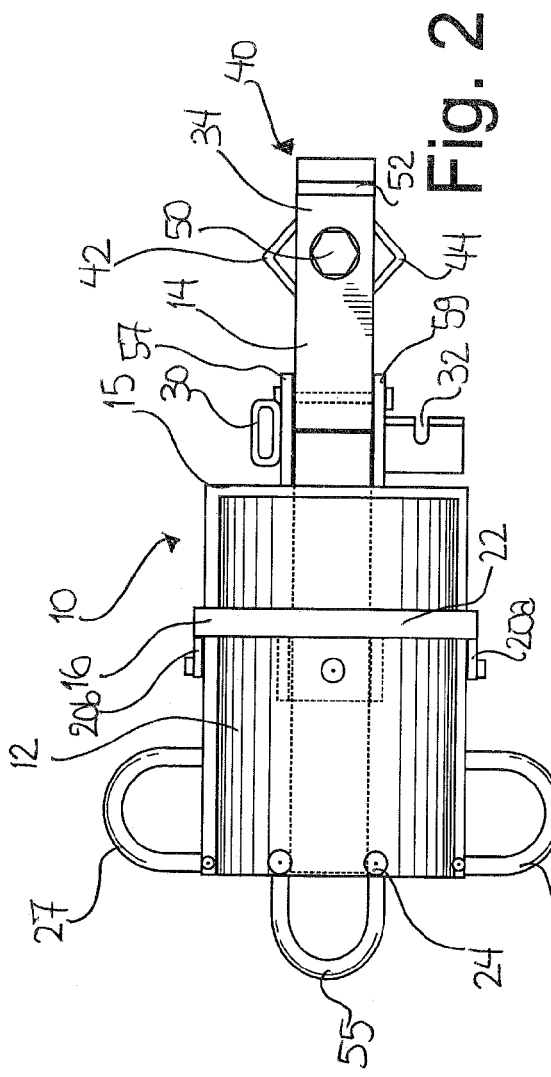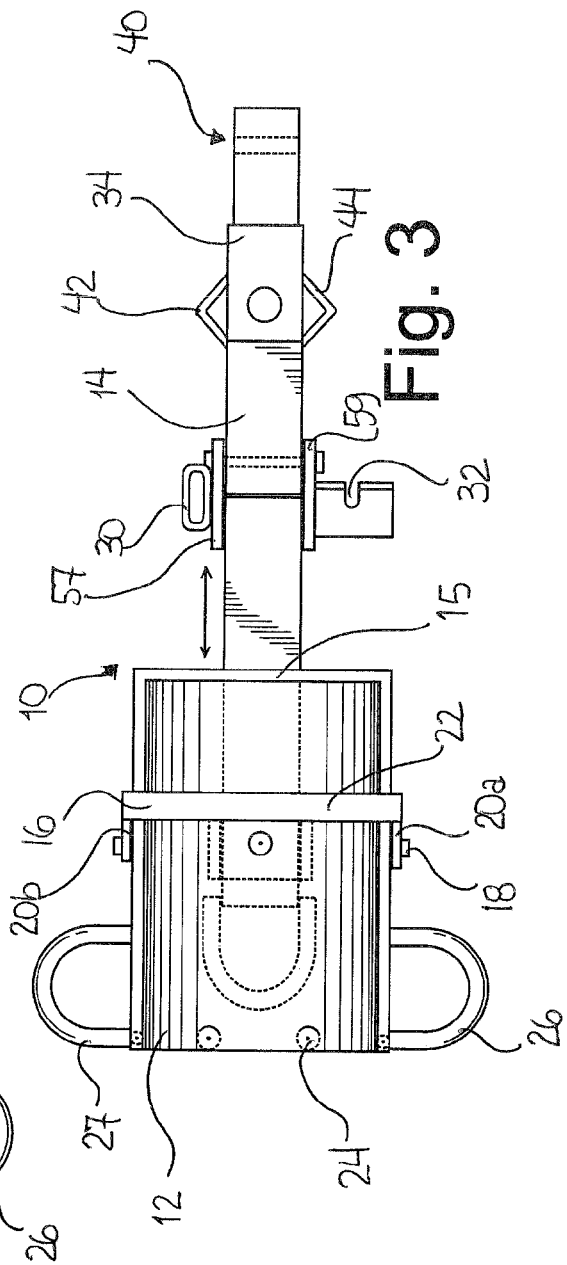

LOG HAULER

This application claims priority on Canadian Patent Application Serial No. 2,551,304 filed Jul. 10, 2006.

BACKGROUND OF THE INVENTION

1. Field of the Invention

The present invention relates to a log hauling device. More particularly, the present invention relates to a log hauling device for use with a four wheeler or similar vehicle to remove logs from the bush in a secure and safe manner.

2. Prior Art

Many different types of log hauling devices and methods are known for removing logs from a wooded area.

One of the more common methods utilized by individuals for removing logs from the bush is to secure one end of a chain or rope to a log to be removed with the other end of the chain or rope secured to a vehicle for towing the log. This is a cumbersome and time consuming method. It is often difficult to wrap a chain or rope around a log and tie the same around the log to securely hold the log. Further, it is often difficult and time consuming, once the log has been towed to the desired location, to remove a chain/rope which has been secured around a log.

U.S. Pat. No. 6,675,848 to Chai discloses an apparatus for conveying timber which utilizes a sledge with a base portion of a curved configuration. A log is placed within the base portion of the sledge and a swing chain is wrapped around the timber to secure it to the sledge. A winching cable is also tied around the timber. The winching cable is then retracted to pull the sledge and the log attached thereto to a desired location.

U.S. Pat. No. 3,517,839 to Jorgensen discloses a log skidding device for towing logs utilizing a towing vehicle. The log skidding device comprises a skid pan having teeth at the base thereof and a transverse clamping jaw for retaining a plurality of logs thereon. The skid pan is connected to a towing vehicle through a winch rope. The skid pan rests on the ground for the loading of the logs. Once the logs are loaded, the winch of the towing vehicle is started thereby pulling the skid pan with the loaded logs up from the ground to the rear end of the towing vehicle.

U.S. Pat. No. 3,086,666 to Larson also discloses a log towing apparatus which utilizes a skidder means connected to a towing vehicle by a tow frame. The skidder means is adapted for the loading of a plurality of logs. The apparatus utilizes a cable and winch arrangement for towing the logs behind the tow vehicle.

SUMMARY OF THE INVENTION

In accordance with one embodiment of the present invention, there is provided a log hauling device which has a frame member; a connection means for connection of the frame member to a tow vehicle; a log carriage and a log retaining means. The frame member has proximal and distal ends and the connection means is at the proximal end of the frame member. The log carriage is slidably mounted on the frame member for movement from a log loading position adjacent the proximal end of the frame member to an extended position adjacent the distal end of the frame member. The log retaining means retains the log within the log carriage.

In accordance with another embodiment of the present invention there is provided a log hauling device for connection to a tow vehicle to haul logs from the bush. The log hauling device has a frame member having a proximal end and a distal end where the distal end is pivotally connected to the proximal end to permit upward movement of the distal end with respect to the proximal end. A connection means is provided at the proximal end of the frame member for connection of the frame member to a tow vehicle. A pivot connection is provided adjacent the proximal end of the frame member to permit side to side movement of the frame member with respect to the tow vehicle. The device further includes a log carriage slidably mounted on the frame member for movement from a log loading position adjacent the proximal end of the frame member to an extended position adjacent the distal end of the frame member. Retaining means are provided for retaining a log in the log carriage.

In preferred embodiments, the log carriage is arcuate or generally U-shaped to conform to a shape of the log and further has a back wall to limit movement of the log within the log carriage.

Preferably, the retaining means is in the form of a chain. Preferably the chain is a 30 grade chain although other suitable chain could be utilized. Other suitable retaining means, such as a rope or jaw could also be utilized. The log carriage preferably includes at least one eye loop on each side for receiving and guiding the chain and a chain slot is provided on said frame to secure the chain in a locked condition.

In preferred arrangements, the log carriage is provided with a plurality of gripping teeth on an interior thereof to aid in gripping and retaining the log within the log carriage.

Preferably, a safety guard is provided for limiting access to the gripping teeth when the log carriage is not in use. The safety guard may be in the form of a safety bar which, when in a use position, is above the gripping teeth to limit access thereto. Preferably, the safety bar is pivotally mounted to the log carriage for pivoting movement from a use position above the gripping teeth to a non-use position adjacent to a back wall of the log carriage.

The connection means for connecting the frame to a tow vehicle can be any suitable connection means such as a hitch/receiver or bolt arrangement.

In preferred embodiments, the frame is provided with stop members to prevent jackknifing of the device with respect to the tow vehicle.

In another preferred embodiment, a pull or tow ring is provided at the distal end of the frame. Such a pull or tow ring is desirable where a user wishes to pull or tow the tow vehicle which may have been stuck in the mud or otherwise. Another use for such a tow ring is to pull a log to a position closer to the tow vehicle to enable an individual to hook up the log to the log carriage. This could be done, for instance if a log is across a river or in a hard to access area. An individual would simply secure a chain or rope around the log and then secure the chain or rope to the tow ring to thus pull the log, via the tow vehicle, to a more desirable location for hookup to the log carriage.

BRIEF DESCRIPTION OF THE DRAWINGS

FIG. 2 is a top plan view of the first embodiment of the present invention, showing the log carriage in the fully retracted position;

FIG. 3 is a top plan view of a second embodiment of the present design showing the log carriage in a fully extended position;

DETAILED DESCRIPTION OF THE INVENTION

Figure 1:
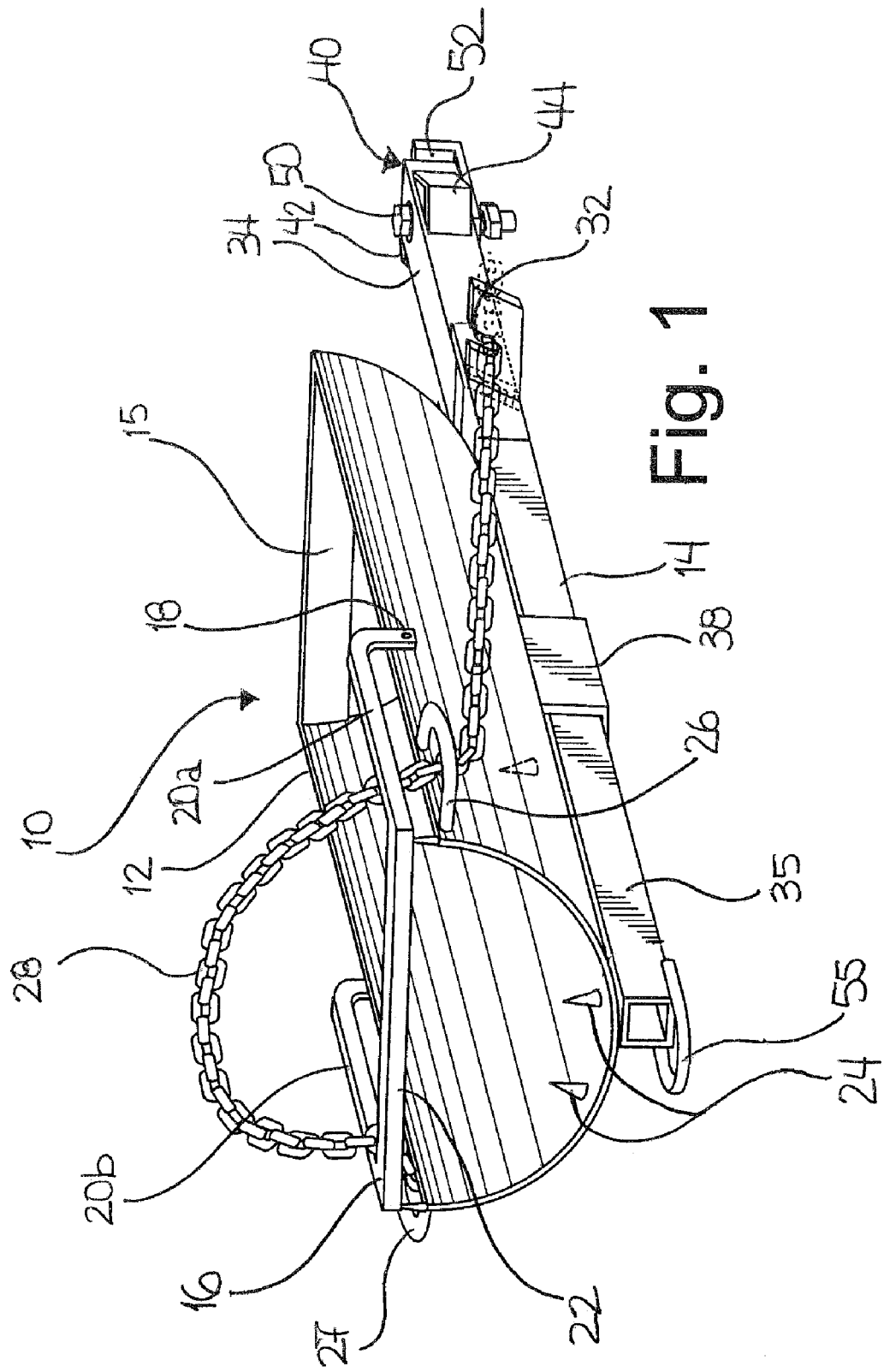
FIG. 1 is a perspective view of a first embodiment of the log hauler of the present invention.

The log hauler, generally designated by reference numeral 10, of the present invention enables the hauling of small logs out of the bush behind a truck or four wheeler all terrain vehicle (ATV) in a simple and secure manner.

Referring initially to FIGS. 1 to 3, the log hauler 10, includes a log carriage 12 which is slidably mounted on a frame member 14. The frame member 14 has a proximal portion 34 and a distal portion 35. The proximal portion 34 includes means, generally designated by reference numeral 40, for connection to a tow vehicle, such as an all terrain vehicle (ATV). The log carriage 12 is mounted to the frame member 14 through member 38 which permits the sliding movement of the log carriage 12 along the frame 14, in such a manner that it can be moved from a retracted position where the log carriage 12 is in a position closer to the proximal end 34 of the frame member 14 (as best seen in FIG. 2) to a fully extended position where the log carriage 12 is at a position adjacent to the distal end 35 of the frame 14 (as best seen in FIG. 3).

A pull or tow ring 55 is provided at the distalmost end of the frame 14. The tow ring 55 can be used if it becomes necessary to pull the tow vehicle, such as for example, if the tow vehicle becomes stuck in the mud or otherwise. The tow ring 55 could also be utilized to pull a log from a location difficult to access to a location where one can easily load the log onto the log carriage 12. This would be desirable, for instance in the case where a log is across a river. A chain can be secured to the log and then to the tow ring 55 and the tow vehicle could then pull the log across the river to a location where the log cold be easily loaded onto the log carriage 12.

The frame 14 is also provided with stop members thereon adjacent to the distal and proximal ends to limit the sliding movement of the log carriage 12 on the frame 14. In this regard, a portion of the tow ring 55 could form a stop at the distal end of the frame 14 and the area of the plates 57 and 59 (which will be discussed hereinafter) could form a stop adjacent the proximal portion of the frame 14.

The log carriage 12 is generally arcuate or has a generally U-shaped configuration and is adapted to receive one end of a log therein. The log carriage 12 includes a back wall 15 which acts as a stop to prevent movement of the log beyond the back wall 15 and an open front end to permit an end of the log to protrude therefrom.

Preferably, the log carriage is composed of steel sheeting although other suitable materials could be utilized. Preferably, the log carriage 12 is about 7 inches to 11 inches (18 cm to 28 cm) in length. A particularly preferred length being about 9 inches (23 cm). In preferred embodiments, the side walls of the log carriage 12 are approximately 3-4 inches (about 7.5 cm to 10 cm) high.

The frame member 14 can be composed of steel tubing. Preferably, the frame has an overall length of about 13 inches to 24 inches (about 33 cm to 61 cm). In particularly preferred arrangements, the frame has a length of about 16 inches to 22 inches (about 40.5 cm to 56 cm).

The log carriage is also provided with a plurality of spikes or teeth 24 arranged in the interior thereof. The spikes or teeth 24 grip the log and aid in securing the log in position on the log carriage 12. The teeth 24 can be of any suitable material and size. In preferred arrangements the teeth are composed of stainless steel and have a height of approximately 1 inch (2.5 cm). In other preferred arrangements, the teeth are at a 45 degree angle with respect to a surface of the log carriage 12.

A safety bar 16 is pivotably mounted at a top of said log carriage 12 on opposed sides thereof. The safety bar 16 consists of two side bars 20a and 20b, one on each side of the log carriage 12, which are mounted to the sides of the log carriage 12 at pivot point 18 and which are joined by a cross bar 22 which extends across the top at the front end of the log carriage 12 when the safety bar 16 is in the lowered engaged position. When the log hauler 10 is in use with a log secured within the log carriage 12, the safety bar 16 is pivoted to an open position where it rests in a non-use position adjacent the back wall 15 of the log carriage 12. Once the log is removed from the log carriage 12, the safety bar 16 is returned to the forward lowered position at the front of the log carriage 12 and acts as a guard to prevent an individual from falling onto the spikes 24 within the bottom of the log carriage 12.

The safety bar can be of any suitable material or dimension. In preferred arrangements, the safety bar is composed of steel tubing.

The log carriage 12 is also provided with chain guide loops or eyes 26, 27 on opposed sides of the log carriage 12 for receiving and guiding a securing chain 28. The securing chain 28 extends from a retention loop 30 on one side of the frame 14, and in use is threaded through the chain loop 27, over the log within the log carriage 12, through the chain loop 26 on the other side of the log carriage 12 and then is secured to a chain slot 32 which is located on the side of the frame 14 opposite to the retention loop 30. The chain can be any desired heavy duty chain of a sufficient length to secure the log as noted above. An example of a suitable chain is a 1" (2.5 cm) grade 30 steel chain. The eye loops 26, 27 are of a suitable size to easily accommodate the desired chain.

Figure 4:
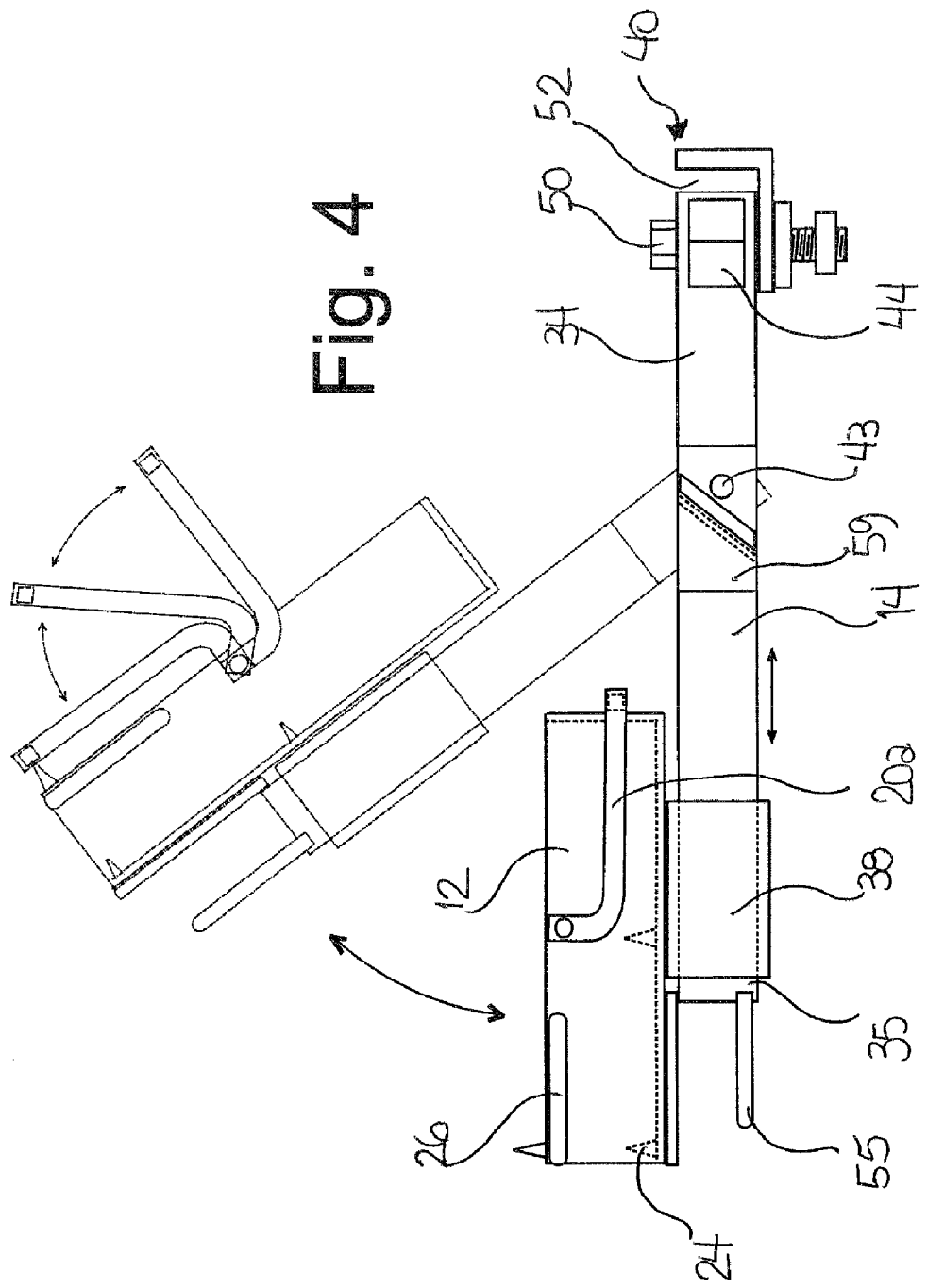
FIG. 4 is a side elevational view of the first embodiment of the present invention.
Figure 5:
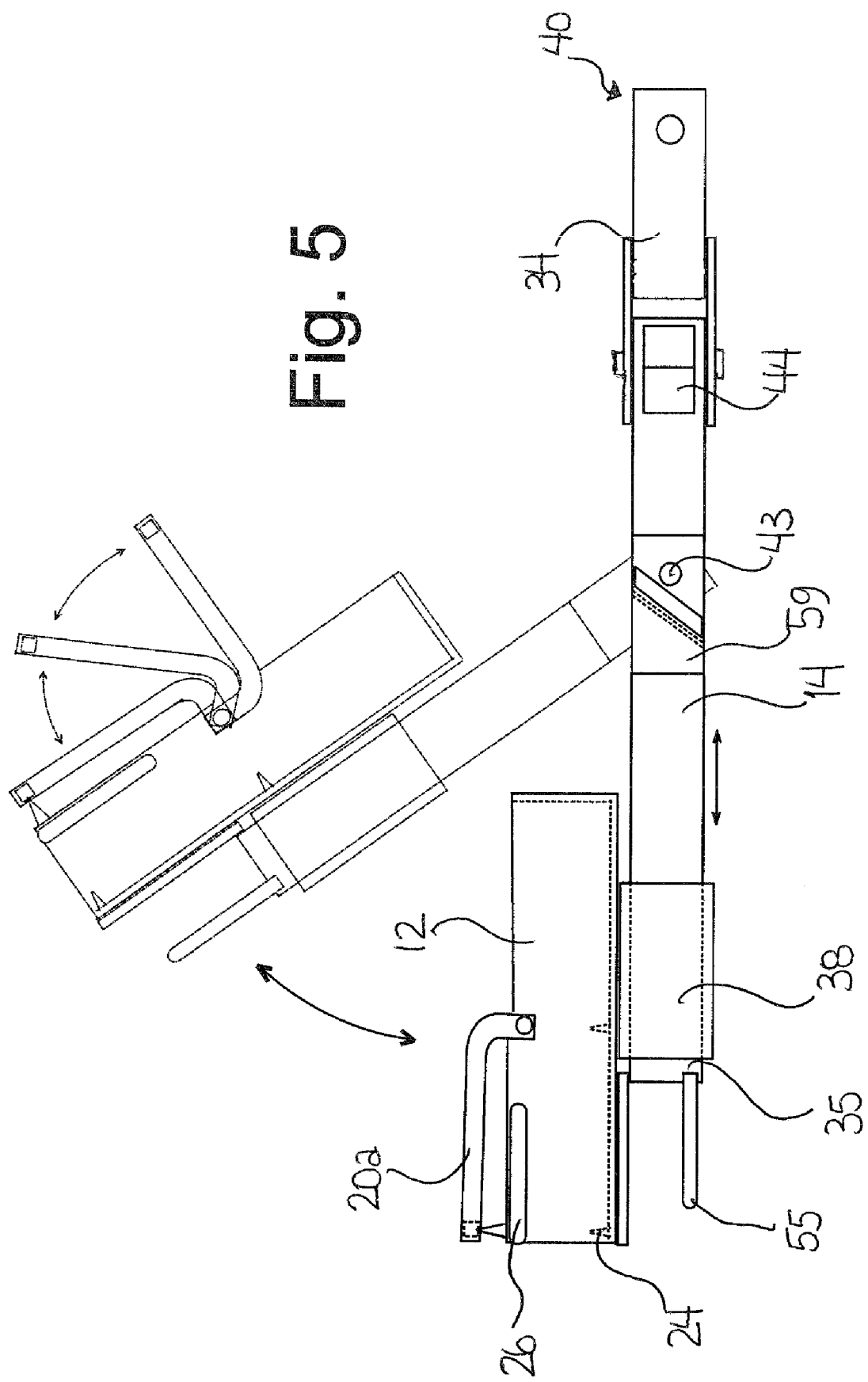
FIG. 5 is a side elevational view of the second embodiment of the present invention.

As best seen in FIGS. 4 and 5, the distal portion 35 of the frame 14 on which the log carriage 12 is slidingly mounted is movable in an upward direction relative to the proximal portion 34 of the frame 14 through pivot point 43 and connection plates 57, 59 connecting the distal portion 35 and proximal portion 34 of the frame together.

Figure 6:
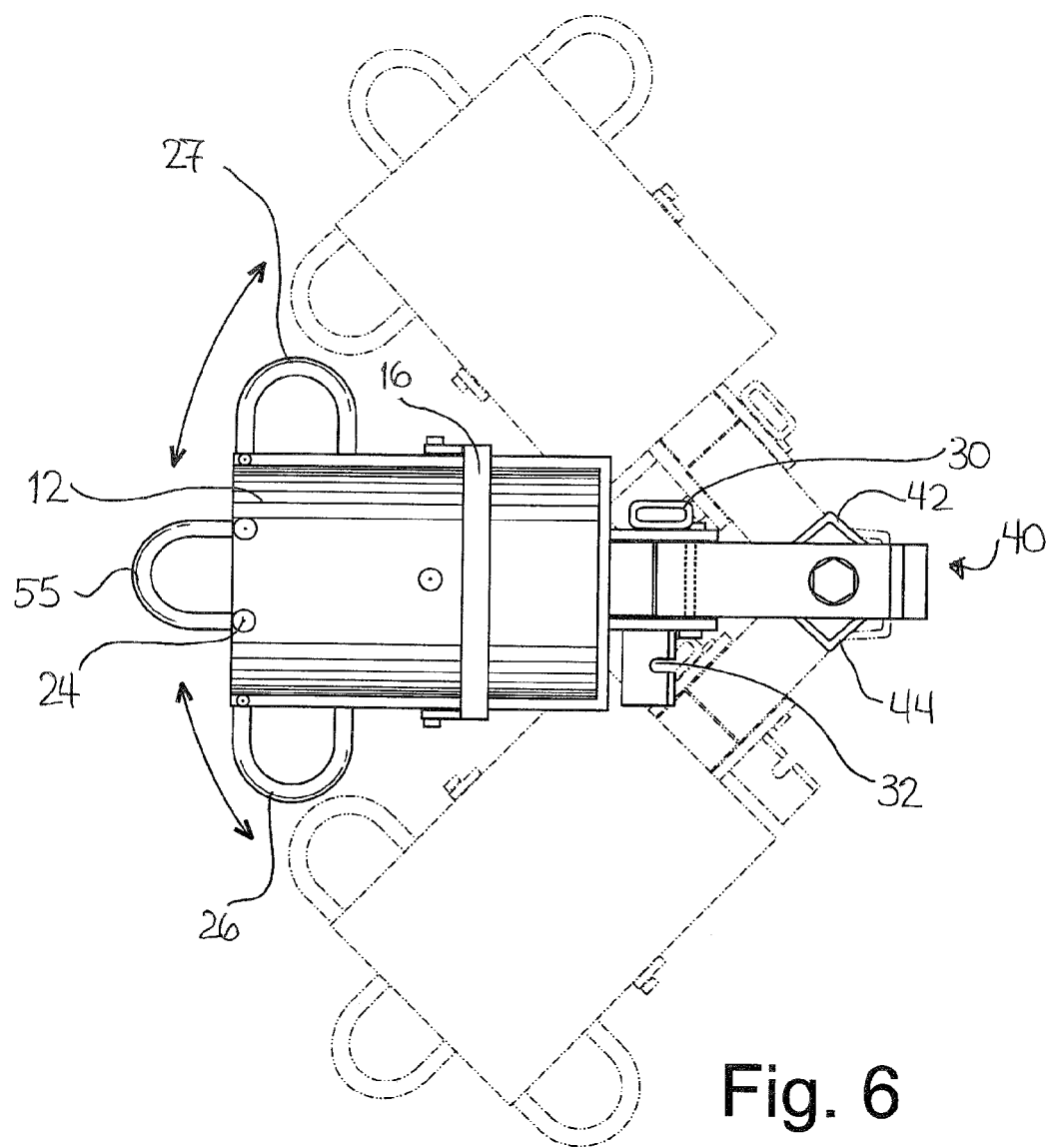
FIG. 6 is a top plan view of the first embodiment of the present invention showing the side to side pivoting motion of the frame.

Further, the frame 14 is also pivotable in a side to side manner with respect to the tow vehicle, as is best shown in FIG. 6.

The connection means 40 of the frame 14 can be any suitable connection means for connection of the frame 14 to the desired tow vehicle. As an example, the connection means 40 can be in the form of a bolt 50 and slot arrangement 52 as best shown in FIGS. 1, 2 and 4, where the bolt and slot arrangement provides for the side to side pivoting movement of the log hauler 10 with respect to the tow vehicle. An alternative connection means 40 could be in the form of a receiver/hitch type arrangement as best shown in FIGS. 3 and 5.

Also provided on the proximal portion 34 of the frame 14 are opposed stop members 42, 44 to prevent the log hauler 10 from swaying to the extreme left or right relative to the tow vehicle.

Figure 7:
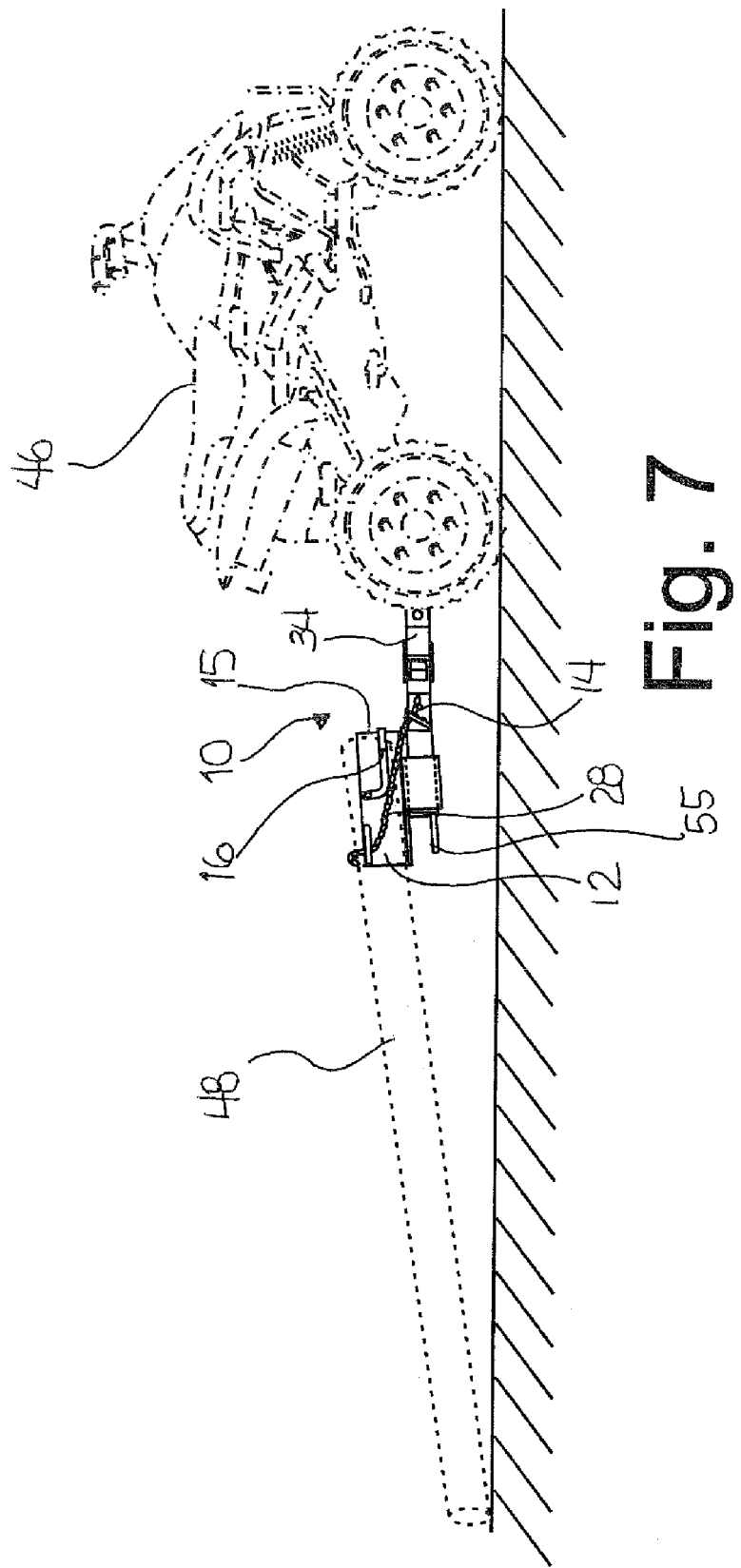
FIG. 7 is a side elevational view of the second embodiment of the present design in use.

Referring now to FIG. 7, when in use, the log hauler 10 is connected to a tow vehicle 46, typically a four wheel ATV. To load the log to be removed, the tow vehicle 46 is backed up to the log 48. With the log carriage 12 in the retracted position (towards the proximal portion 34 of the frame 14), the safety bar 16 is raised and positioned into its non-use position adjacent to the back wall 15 of the log carriage 12. The end of the log 48 is positioned within the log carriage 12 with the end of the log 48 close to or abutting the back wall 15. The securing chain 28 is fed through the eye loop 27, over the log and through the eye loop 26. The chain 28 is then tightened and secured to the chain slot 32. Once the securing chain 28 is secured, the vehicle 46 can be driven forward. As the vehicle 46 moves forward, the log carriage 12 starts to slide into a fully extended position (towards the distal end 35 of the frame 14) due to weight of the log 48 and the forward momentum of the vehicle 46. This movement of the log carriage 12 serves to tighten the chain 28 onto the log 48 which in turn pulls the log 48 down onto the spikes or teeth 24 which aid in gripping the log 48. The log 48 can then be towed from the bush to the desired location.

Once the log 48 is towed out of the bush and one desires to unhook the log 48, the vehicle 46 is simply backed up a little, which causes the log carriage 12 to slide back into the retracted position, which in turn allows the chain 28 to loosen somewhat permitting easy and quick removal of the chain 28.

Once the log is removed, the safety bar 16 is then returned to its engaged position at the front of the log carriage 12 to guard against any one inadvertently falling onto the log carriage 12 and injuring themselves on the spikes 24.

While the invention has been described in detail and with reference to preferred embodiments thereof, it will be understood that various modifications and changes can be made therein without departing from the spirit and scope of the invention.

What is claimed is:

1. A log hauling device comprising:
   a frame member having a proximal end and a distal end;
   a connection means at said proximal end of said frame member for connection of said frame member to a tow vehicle;
   a log carriage slidably mounted on said frame member for movement from a log loading position adjacent said proximal end of said frame member to an extended position adjacent the distal end of said frame member; and
   retaining means for retaining a log in said log carriage.

2. The log hauling device according to claim 1, wherein said log carriage has a back wall to limit movement of the log within the log carriage.

3. The log hauling device according to claim 1, wherein said retaining means comprises a securing chain for retaining the log securely within the carriage.

4. The log hauling device according to claim 1, further comprising gripping teeth within an interior of said log carriage to aid in gripping the log.

5. The log hauling device according to claim 1, wherein said log carriage is arcuate.

6. The log hauling device according to claim 5, further comprising a safety guard for limiting access to the gripping teeth when the log hauling device is not in use.

7. The log hauling device according to claim 6, wherein said safety guard is in the form of a safety bar which, when in a use position, is above the gripping teeth to limit access thereto.

8. The log hauling device according to claim 7, wherein said safety bar is pivotably mounted to said log carriage for pivoting movement from a use position above the gripping teeth to a non-use position adjacent to a back wall of said log carriage.

9. The log hauling device according to claim 1, wherein said connection means is a hitch/receiver arrangement.

10. The log hauling device according to claim 1, wherein said connection means is a bolt adapted to be bolted to a rear of a vehicle.

11. The log hauling device according to claim 1, wherein the log carriage is provided at least one eye loop on each side for receiving the chain and a chain slot is provided on said frame to secure the chain in a locked condition.

12. The log hauling device according to claim 1, wherein the frame is provided with stop members to prevent jackknifing of the device with respect to the tow vehicle.

13. The log hauling device according to claim 1, wherein the frame member includes first frame section and a second frame section extending from the first frame section, said second frame section being pivotably connected to said first frame member for vertical movement, and wherein said connection means is on the first frame section and the log carriage is slidable on said second frame section.

14. The log hauling device according to claim 1, wherein said connection means permits pivoting movement of said frame in a side-to-side manner with respect to said tow vehicle.

15. A log hauling device for connection to a tow vehicle to haul logs from the bush, said log hauling device comprising:
   a frame member having a proximal end and a distal end, said distal end pivotally connected to said proximal end to permit upward movement of said distal end with respect to said proximal end;
   a connection means at said proximal end of said frame member for connection of said frame member to a tow vehicle;
   a pivot connection adjacent said proximal end of said frame member to permit side to side movement of said frame member with respect to said tow vehicle;
   a log carriage slidably mounted on said frame member for movement from a log loading position adjacent said proximal end of said frame member to an extended position adjacent the distal end of said frame member; and
   retaining means for retaining a log in said log carriage.

16. The log hauling device according to claim 15, wherein said log carriage has a back wall to limit movement of the log within the log carriage.

17. The log hauling device according to claim 15, wherein said retaining means comprises a securing chain for retaining the log securely within the carriage.

18. The log hauling device according to claim 15, further comprising gripping teeth within an interior of said log carriage to aid in gripping the log.

19. The log hauling device according to claim 15, further comprising a safety guard for limiting access to the gripping teeth when the log hauling device is not in use, said safety guard being a safety bar which is pivotably mounted to said log carriage for pivoting movement from a use position above the gripping teeth to a non-use position adjacent to a back wall of said log carriage.

20. The log hauling device according to claim 15, further comprising:
   stop members at a proximal end of said frame to prevent jackknifing of the device with respect to the tow vehicle; and
   a tow ring at the distal end of said frame.

* * * * *